United States Patent

De Santis et al.

[15] 3,680,058

[45] July 25, 1972

[54] INFORMATION PROCESSING SYSTEM HAVING FREE FIELD STORAGE FOR NESTED PROCESSES

[72] Inventors: Alfred J. De Santis, Norristown; LeRoy W. Beers, Exton; James A. White, West Chester; John A. Moysey, Malvern, all of Pa.

[73] Assignee: Burroughs Corporation, Detroit, Mich.

[22] Filed: Nov. 28, 1969

[21] Appl. No.: 880,535

[52] U.S. Cl. ........ 340/172.5
[51] Int. Cl. ........ G06f 15/16
[58] Field of Search ........ 340/172.5

[56] References Cited

UNITED STATES PATENTS

| | | | |
|---|---|---|---|
| 3,331,056 | 7/1967 | Lethin et al. | 340/172.5 |
| 3,401,375 | 9/1968 | Bell et al. | 340/172.5 |
| 3,500,337 | 3/1970 | Womack | 340/172.5 |
| 3,374,467 | 3/1968 | Cast | 340/172.5 |
| 3,387,280 | 6/1968 | Bina | 340/172.5 |
| 3,577,130 | 5/1971 | Rice et al. | 340/172.5 |
| 3,581,287 | 5/1971 | Greenspan et al. | 340/172.5 |
| 3,411,139 | 11/1968 | Lynch et al. | 340/172.5 |

*Primary Examiner*—Paul J. Henon
*Assistant Examiner*—Ronald F. Chapuran
*Attorney*—Paul W. Fish, Charles S. Hall and Mervyn L. Young

[57] ABSTRACT

This disclosure relates to an information processing system employing plural processors which system is provided with a free field storage array to accommodate operands and data segments of any size and format. Each of the respective memory storage units is, in fact, structure oriented. However, pairs of such storage units are provided with isolation units having the capability of extracting and inserting fields of information independent of the memory structure. During a fetching operation, the isolation unit is adapted to fetch two contiguous parallel words and a shifting network or barrel switch is provided to position the desired field for transfer to the requesting device. During a store operation, the shifting network or barrel switch is employed to position incoming data into the proper bit location of the memory. The selected field is determined by the starting bit and the length field information provided by the memory control word and also by the type of operation requested. Each of the requesting devices is provided with its own interface unit that contains logic to construct a memory control word for each memory module involved in a fetch or store operation. In this manner, the entire array of memory units will appear to each of the requesting devices as being free field or without structure.

17 Claims, 12 Drawing Figures

INVENTORS.
ALFRED J. DESANTIS
LEROY W. BEERS
JAMES A. WHITE
JOHN A. MOYSEY
BY
ATTORNEY

INVENTORS.
ALFRED J. DE SANTIS
LEROY W. BEERS
JAMES A. WHITE
JOHN A. MOYSEY
BY
ATTORNEY

INFORMATION PROCESSING SYSTEM HAVING FREE FIELD STORAGE FOR NESTED PROCESSES

This invention relates to an information processing system that is provided with a free field storage or memory unit, and more particularly to such a system wherein operands and data segments can be of any size format.

BACKGROUND OF THE INVENTION

Large scale data processing systems find many applications for multi-programming including concurrent batch processing, real time processing and time sharing. In order to accommodate a number of such unrelated jobs or tasks, prior art systems have been provided with operating systems or control programs which supervise such activities as task sequencing, storage allocation, and the like. Also included in the operating system are the various compilers or language translators which allow the programmer to employ different programming languages that do not require knowledge of the circuit characteristics of the system. It will be appreciated that the type of tasks for which the machine is to be used will affect the operating system which in turn affects the design of the system itself. If the machine is designed to be job oriented then the supervisory program is geared to execute an incoming stream of programs and its associated input data. On the other hand, if the machine is designed for real-time or time sharing operations, the supervisory program views incoming pieces of data as being required to be routed to the number of processing programs. When the machine is designed for time sharing, then protection of different programs and related resources becomes important.

Although a single processor system may be multi-programmed, a greater degree of flexibility is achieved from a multi-processing system where a number of separate processes may be assigned to a plurality of processors. Examples of such multiprocessing systems are disclosed in the Anderson et al U.S. Pat. No. 3,419,849 and Lynch et al U.S. Pat. No. 3,411,139. A central processor of the type employed in the Lynch et al patent is disclosed in Barnes et al U.S. Pat. No. 3,401,376. Each of the above mentioned patents is assigned to the assignee of the present invention.

The above described systems employ operating systems which were designed for multi-processing systems. A particular distinction of the present invention is that the processor module employs circuitry to evaluate system instructions at a faster speed than previously accomplished. More importantly, the operating system of the present invention and the circuitry adapted to implement that system are designed to provide an architecture to more readily accommodate multi-task processing including time sharing applications as well as real time applications and batch processing.

It is particularly advantageous to have systems programs such as service programs which are recursive or reentrant in nature. Furthermore, it is advantageous that such recursiveness exists in a hierarchy of levels and not just one level. Furthermore, it is advantageous and even necessary that certain of the system programs as well as the user programs be protected in memory from unwarrented entry by unrelated processes being carried out elsewhere in the system. Still another characteristic which is advantageous is that of providing functions common to various source languages which functions are implemented in circuitry where possible to provide faster execution times.

Various programming languages or source languages have been devised which allow the user to write programs without specific knowledge of the machine language which the system employs. Among the various programming languages which have been devised are Fortran, Cobol, Algol and PL/1. A particular problem in devising compilers or translators for the source languages is that of a difference not only in the type of operators to be employed but also in their instruction formats as well as in the data structures involved. Such structural format differences and operator requirements occur in part because of the different memory organizations that are designed for different processing systems. Thus, if one system were particularly adaptable for employing a particular programming language, it would not necessarily be as readily adaptable for another programming language. Therefore, it would be desirable to have a memory organization which is free of any internal structure and which can accommodate data and instruction segments of an almost infinite variety of sizes. Not only does such a structure free memory accommodate different sized information segments, but it also allows for greater data compaction.

It is impractical to build a completely bit addressable memory, and memories are designed to be word or byte oriented. Prior art memories have been designed to be able to store and fetch to or from any selected byte location in a word oriented memory. However, this still does not allow for selection of a field of any size larger or smaller than a byte, which field can start at any selected bit location. This is particularly advantageous in accommodating different problem solutions for which various program languages and data formats have been designed.

It is therefore an object of the present invention to provide an improved multi-processing system for such diverse applications as time sharing, scientific problem solving and other data processing tasks.

It is still another object of the present invention to provide an improved multi-processing system that can handle complex data structures which may be both nested and composed of variable type and length elements.

It is still another object of the present invention to provide a multi-processing system that may readily accommodate the sophisticated program structures dictated by present and future source languages.

RELATED U.S. PATENT APPLICATIONS

U.S. Pat. applications directly or indirectly related to the subject application are the following:

Ser. No. 880,537 filed Nov. 28, 1969, by R. V. Bock, et al and titled "Information Processing System Having Means for Dynamic Memory Address Preparation,"

Ser. No. 880,536 filed Nov. 28, 1969, by F. V. Rehhausser, et al and titled "Information Processing System Implementing Program Structures Common to Higher Level Program Languages,"

Ser. No. 9,275 filed Feb. 6, 1970, by J. C. Trost, et al "Autonomous Multiple-Path Input/Output Control System."

SUMMARY OF THE INVENTION

Although it is impractical to build a memory unit which is, itself, individually bit addressable, the present invention is directed toward isolation and interface units between the memory and the various requesting modules for addressing a pair of contiguous word locations in one or more of such memory modules and then selecting the desired field from that pair of locations. This is particularly advantageous in a multiprocessing system having a plurality of memory storage units.

Thus, a feature of the present invention resides in addressing circuitry for one or more memory storage units for selecting any variable length field from a memory unit by addressing a contiguous pair of word locations and selecting a desired field from that pair.

Another feature of the present invention resides in such circuitry adapted to sequentially select any number of contiguous pairs of word locations to address a field of any desired length.

Still another feature of the present invention resides in a shifting network in combination with said addressing circuitry for selecting the desired field from the pair of word locations for transmission to a requesting device during a fetch operation and also for positioning the selected field for proper insertion in the memory unit during a store operation.

Still another feature of the present invention resides in interface units provided for each of the requesting devices to create memory control words to initiate said fetching and storing of selected fields and to create additional control words when the selected field overlaps two or more memory modules.

DESCRIPTION OF THE DRAWINGS

The above and other objects, advantages and features will become more readily apparent from a review of the following description in relation with the drawings wherein.

GENERAL DESCRIPTION OF THE SYSTEM

Multiprocessing systems, as well as multi-programming systems, can be viewed as a series of related or unrelated programs, tasks or jobs which hereinafter will be called processes. An elementary process is a serial execution of operators by a single processor. A process may be partitioned into subprocesses or may be part of a parent process. In this way a process hierarchy can be established. The term "process" may be defined as an association between a processor and address space. The address space is the set of all storage that is acceptable by that process. All the available storage space in the system can be viewed as holding a global process which is the ancestor of all other processes and subprocesses in the system. Such a global process can be viewed as including the entire operating system with supervisory programs, service programs and compilers as well as the various user programs.

The address space of the system of the present invention extends over all the levels of storage including the main store and a back up store as well as peripheral devices. This system is, of course, provided with a plurality of processors each of which is provided with a resource structure in memory to store the definition of a new work space or spaces. This resource structure, which will be described in more detail below, permits each processor to keep track of the relation between the entire global process space (the memory or storage) and the particular process space with which it is currently associated.

The process resource structure is the mechanism used to pass all resources between processes of the process hierarchy and, therefore, it is an integral part of the resource protection scheme as required for protection of different user programs during time sharing as well as for protection of the different processes in general. As a particular processor moves from a parent process to a subprocess, allocated resources are stacked in the processor's resource structure and are removed from the process resource structure when the processor moves from the subprocess back to the parent process. In this way, the resource structure contains all of the dynamically allocated resources which its processor might require for any particular subprocess. A particular system management process is the only process which may directly access entries into each of the resource structures.

Figure 1:
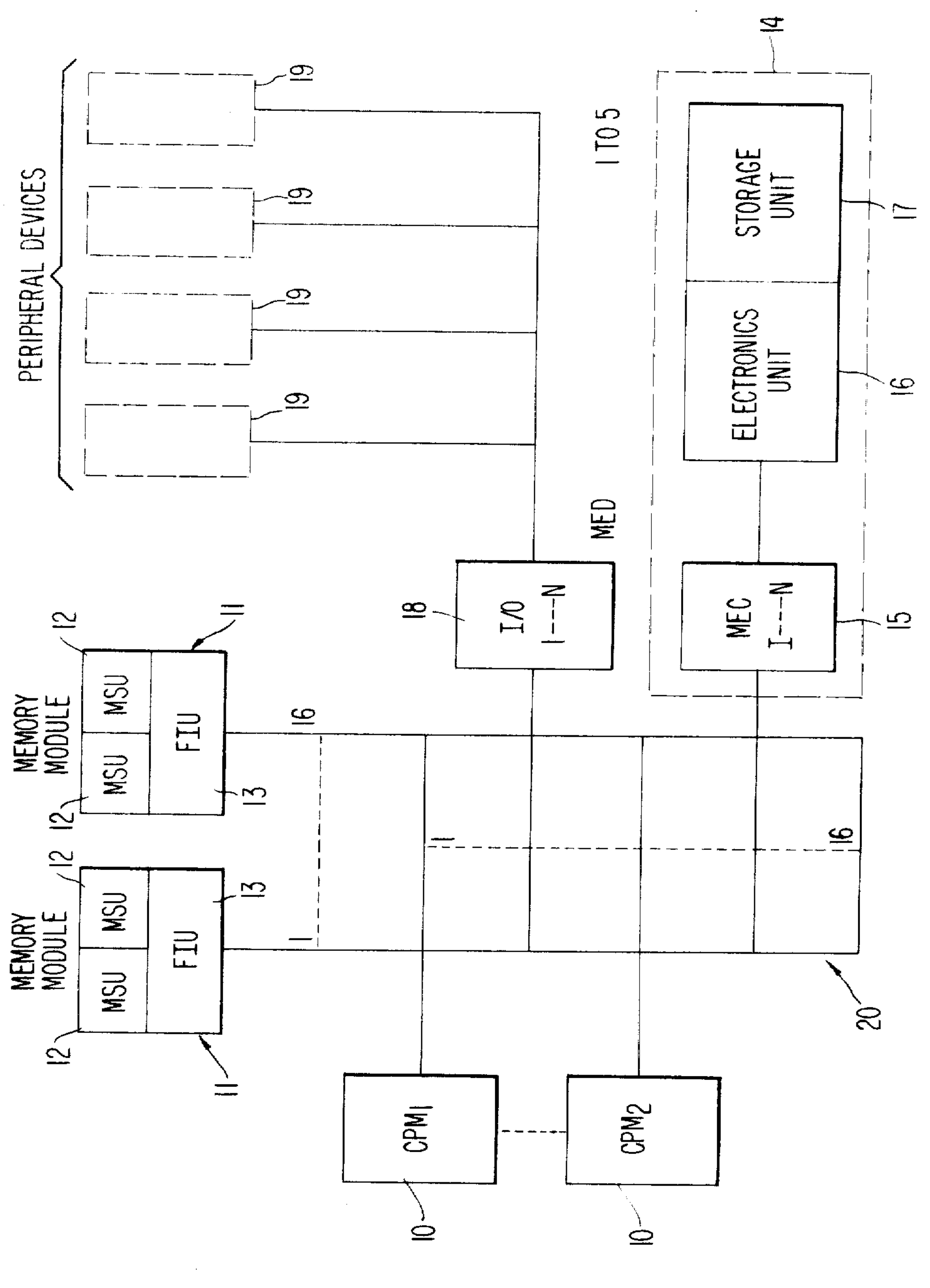
FIG. 1 is a schematic representation of a system of the type employing the present invention.

By generally describing the process architecture in the manner above, one has also generally described the manner in which the various levels of storage are employed. A brief description will now be given of the system of the present invention adapted to utilized such process architecture. Referring now to FIG. 1, there is shown therein a general representation of the type of system embodying the present invention. This system includes a plurality of central processor modules 10 and one or more I/O control modules 18 which along with back up memory 14 are connected to a plurality of memory modules 11 by way of a switch interlock 20. Each of the memory modules 11 is comprised of two memory storage units 12 and an isolation unit 13 the function of which will be more thoroughly described below. Back up memory 14 is comprised of memory extension controller 15 and a plurality of units 16 and 17 which may include registers, core storage or disc files. Back up memory 14 will hereinafter be referred to as level 2 memory. One or more of the I/O controllers 18 are employed to establish communication to the plurality of peripheral devices 19.

The organization as illustrated in FIG. 1 does not differ substantially from that disclosed in the above mentioned Lynch et al U.S. Pat. No. 3,411,139. However, the system of the present invention does distinguish quite differently therefrom in the manner in which it employs the process hierarchy described above and in the manner in which the features of the present invention are adapted to employ that hierarchy.

The principle features of the present invention reside both in the manner in which the respective memory modules 12 are adapted to appear to the system as a free field storage and in the manner in which the respective processors 10 are adapted to utilize this storage to employ the process hierarchy described above.

Figure 2:
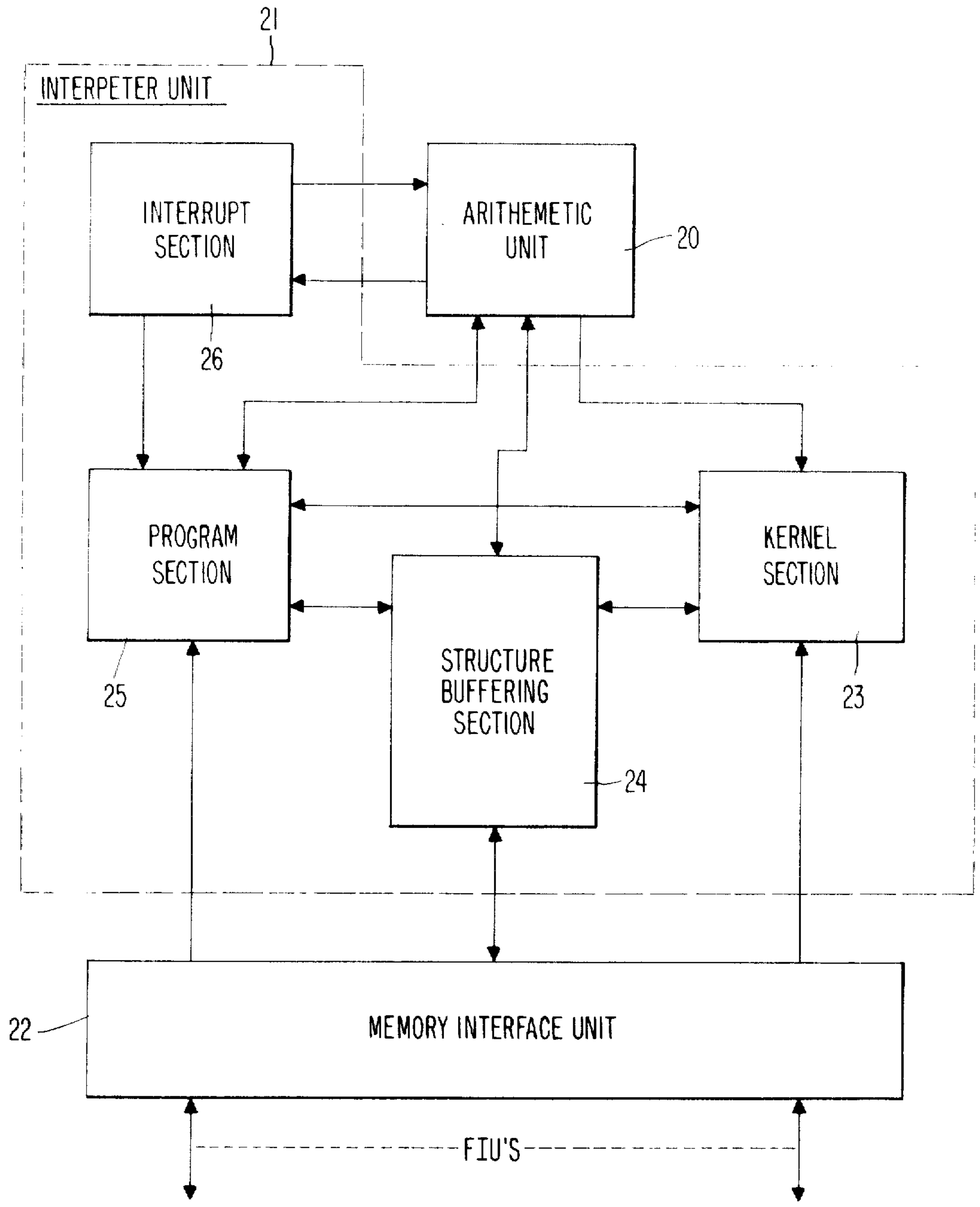
FIG. 2 is a schematic representation of a processor employed with the present invention.

The features of the processor will be first described generally in reference to FIG. 2. As illustrated in FIG. 2, interpreter unit 21 along with arithmetic unit 20 serve to form the system of processor 10 such as illustrated in FIG. 1. Memory interface unit 22 serves as the communications interface between interpreter 21 and the respective memory modules 11 of FIG. 1. Interpreter 21 is formed of four basic sections: kernal section 23, structure buffering section 24, program section 25 and interrupt section 26.

The main function of each processor 10 is to activate and deactivate processes, direct information transfers between modules, service interrupts and execute arithmetic calculations required by a program. These functions are performed under the direction of a master control program (MCP). The processor minimizes memory access times by utilizing phased fetches and stores where possible, and by associatively buffering information. Execution speeds are enhanced and hardware costs are minimized by the centralization of controls of the functionally independent subsections within the interpreter unit 21. Within each processor, it is interpreter 21 which controls the movement of program and data, provides automatic memory protection, responds to interrupts and controls, and empties and replenishes the various stacks and buffers within the processor.

Within the interpreter, program section 25 fetches, interprets and executes the program operators in the program string. Kernel section 23 fetches, interprets, executes and updates descriptors which are referred to by name in the program string according to the program operator being executed. Structure buffering section 24 consists of a set of local memories which buffer frequently accessed items in order to minimize level-1 (main store) fetches. The buffering is based on the structures used to define the processor. Interrupt section 26 receives interrupts and faults, examines them and passes the appropriate fault or interrupt signal to accomplish a change in program.

Interpreter unit 21, then, is designed to provide the processing control for the system by means of structure operators specifically designed for efficient management of data and program structures, and by means of program operators selected to allow easy implementation of higher level languages. The control information is distributed, as required, to the arithmetic unit and through the memory interface unit 22 to the memory module.

While the main memory or level-1 memory is adapted to appear to the system as being free field or without structure, the various processes and information segments stored therein will, of course, be structured. Descriptors are provided to designate or point to the various information structures in memory, and also describe such structures as well as their significance in relation to the process in which they reside or to the parent process if the structure itself is a subprocess.

Figure 4:
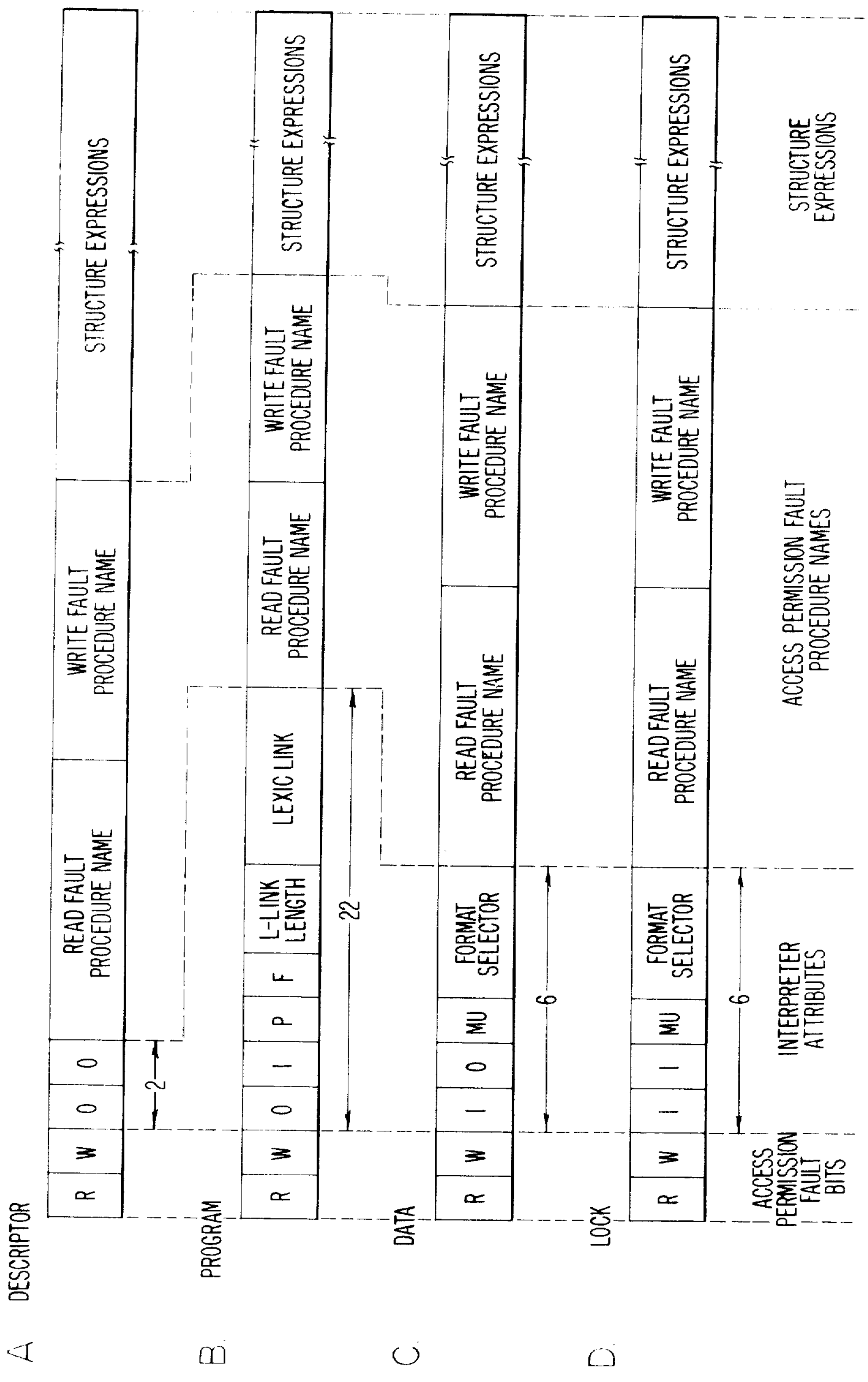
FIG. 4 is a representation of descriptor formats as employed with the present invention.

In this sense, accessing of all structured information in the various levels of memory involves an evaluation of descriptors which evaluation is performed by kernel section 23 as illustrated in FIG. 2. As illustrated in FIG. 4, there are four types of descriptor formats to respectively reference locked data fields, data objects, program segments or other descriptors.

Each of the descriptors contains three major information sets or expressions. These are referred to as the access attributes, interpreter attributes and structure expressions. The access attributes define protection capability and also specify whether an element referenced in memory can be stored or fetched. The interpreter attributes define the characteristics of that referenced element and the structure expression contains the type of structure within which the element resides and this defines the structure and structure parameter fields which give the parameters necessary for accessing that structure. It is to be noted in reference to FIG. 4, that each descriptor can contain as many structure expressions as are necessary to obtain a desired element.

DETAILED DESCRIPTION OF THE SYSTEM

A. Interpreter

Figure 3:
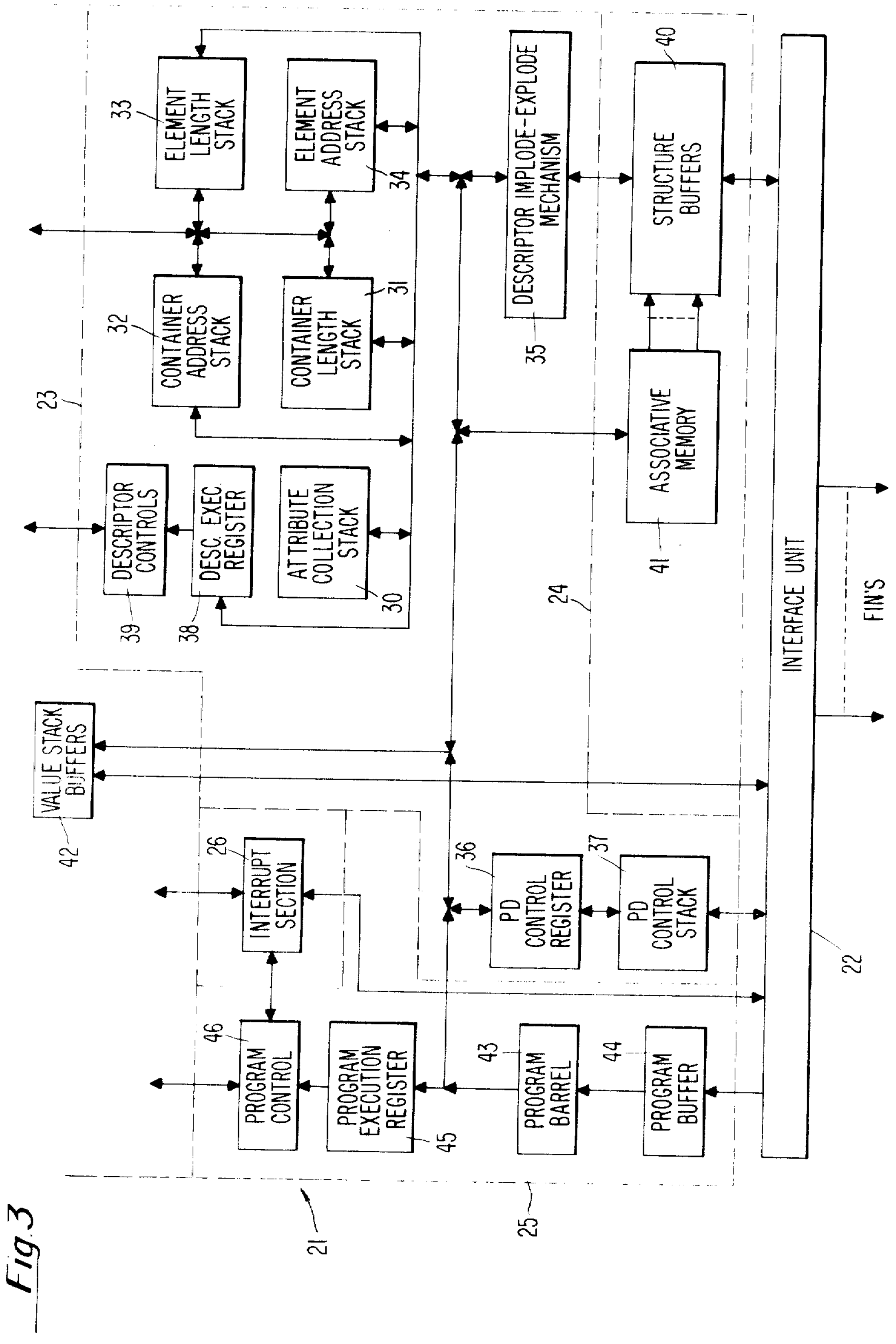
FIG. 3 is a schematic representation of the interpreter portion of the processor.

The reader is now referred to FIG. 3 which illustrates the circuitry employed by interpreter 21 and more specifically by kernel section 23 to evaluate the respective descriptors and structure operators. The kernel hardware includes five attribute stacks 30, . . . , 34; descriptor implode-explode mechanism 35; the program/descriptor control register 26; descriptor execution register 38 as well as descriptor controls 39 and program/descriptor control stack 37. Kernel section 23 receives data from structure buffers 40, value stack 42, program barrel circuit 43 and arithmetic unit 20 as illustrates in FIG. 2. Kernel section 23 sends data to structure buffers 40 and to arithmetic unit 20.

Each of the structures in memory can be thought of as being contained in address space defined by an address and a length. Thus, in the evaluation of structure expression, each instruction after the initial one in that expression operates on a container address in container address stack 32 of FIG. 3 and on container length in container length stack 31 in order to define a proper substructure within the container. A fault occurs if the subfield is not wholly contained in the container so defined. Unless otherwise specified, parameters required by certain instructions are found in the value stack which resides in memory and supplies values to value stack buffers 42 of FIG. 3.

In FIG. 3, attribute collection stack 30 then serves to collect access permission attributes, segment numbers and format selectors which are received from the various descriptors during evaluation. The other four stacks 31, . . . , 34 are used for structure expression parameter manipulation. Each stack consists of four words which are 32 bits long. The stacks interface with the arithmetic unit for all calculations. They also utilize and modify the structure expressions in the structure and descriptor buffer 40 and they receive parameters from the value stack by way of value stack buffers 42 and program barrel circuit 43. The stacks are manipulated individually. Two of the stacks hold container information (starting address and length) while the remaining two stacks hold element information (starting address and length). The respective stacks are so indicated in FIG. 3. During evaluation, the stacks will hold intermediate values of such containers for length information and self identifying structures. At the end of every structure type evaluation, the element stacks will be empty while the container stacks will have a partial reference to the object of the descriptor. The partial reference is a container address and a length corresponding to the point up to which the descriptor has been evaluated.

B. Memory Modules

The primary function of memory modules 12 of FIG. 1 is to enable the requesting devices to extract fields of information or to insert fields of information anywhere within the memory system. A field of information is defined as any number of bits whose starting bit position may exist anywhere within the memory system. FIG. 1 shows the relationship of the memory modules 12 to the other devices in the system. There are three types of requesting devices: central processor modules 10, input/output module 18 and the memory extension controllers 14. The maximum number of memory modules that may be assigned to the system is preferably 16 and each memory module shall be capable of servicing any combination of a maximum of 16 requesting devices. The memory modules shall make no distinction between the requesting devices so that any operation performed for one requesting device can be performed for any other requesting device.

As indicated in FIG. 1, there are preferably 2 memory storage units 12 associated with each field isolation unit 13 to make up the complete memory module 11. However, in a particular system there may exist only one memory storage unit 12 with particular isolation unit 13. Each memory storage unit 12 will store information in a core memory stack although other forms of memory may be employed for the purpose of the present invention, and such unit shall have the capability of presenting this information upon request. Each memory storage unit 12 shall interface only with its own field isolation unit 13 so that all operations within the system shall first pass through a particular field isolation unit before being initiated.

Figure 6:
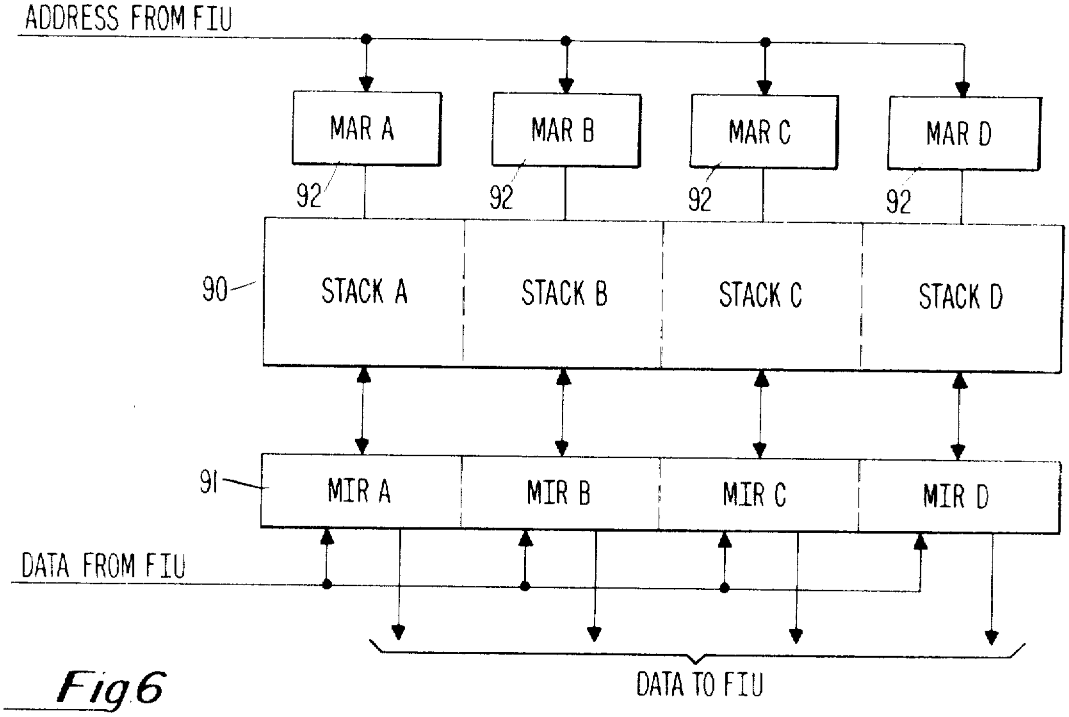
FIG. 6 is a schematic representation of a memory storage unit of FIG. 5.
Figure 5:
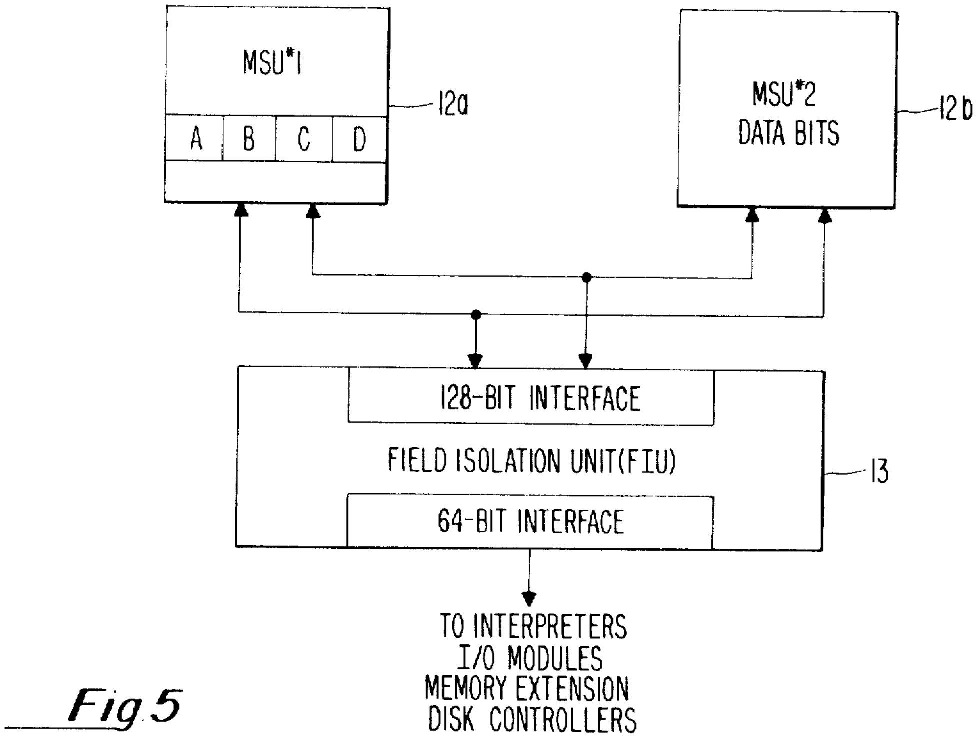
FIG. 5 is a schematic representation of a memory module of FIG. 1.

As indicated in FIGS. 5 and 6, each memory storage unit 12 is in fact structure oriented and divided into a plurality of stacks. Each memory stack is preferably made up of 8192 locations, each of which contain 288 available bits of information. Out of these 288 bits, 256 shall be used by the system as memory space and the remaining 32 bits shall be used internally as error code information. The error code bit shall pertain only to the proceeding 64 bits of information. Whenever information is stored within the memory, these error code bits shall be set according to the new information in the stack word.

C. Field Isolation Unit

Each field isolation unit 13 shall be provided with logic which provides the capability of extracting or inserting fields of information independent of memory structure. The memory shall therefore be treated by the requesting device as one continuous space having the ability to accept fields starting at any point (bit) and continuing for any prescribed length.

Figures 7, 11, 12:
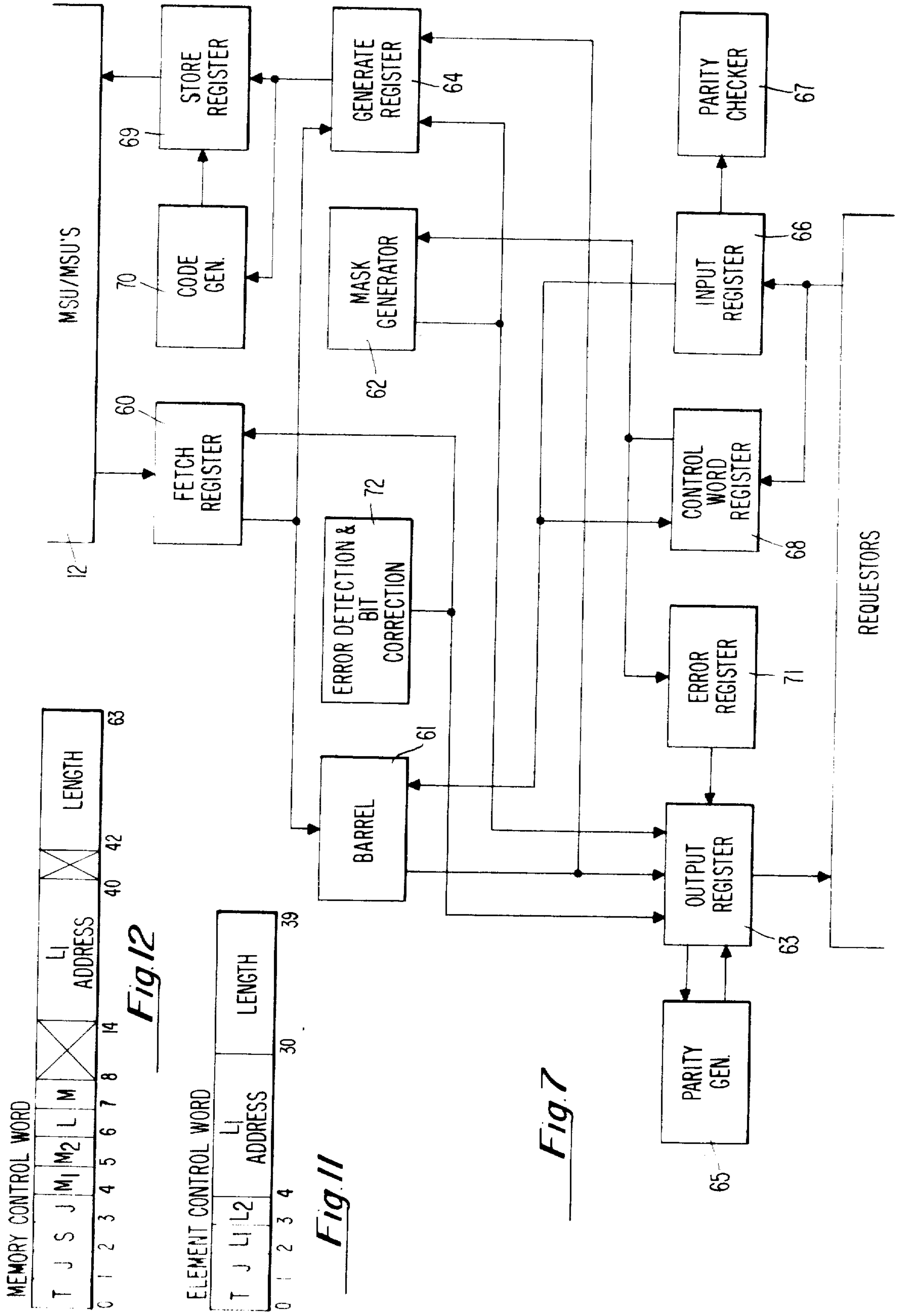
FIG. 7 is a schematic representation of a field isolation unit of FIG. 6.
FIG. 11 is a representation of the element control word format.
FIG. 12 is a representation of a memory control word format.

Field isolation unit 13 consists of 13 major functional components which are interconnected. As shown in FIG. 7, fetch register 60 is a 144-bit register to be used to contain a copy of two memory words. Thus, the first set of 72 bits is a copy of the memory word that contains the present starting bit of a field, and the second set of 72-bits is a copy of the memory word that contains the continuation of a field. For example, if an operation specifies the starting bit to be bit 5 in memory word B and the length is more than 59 bits, the fetch register 60 would receive words B and C. During fetch operation, the fetch register 60 is used to present memory words to barrel logic 61 for field extraction. During the store operation, fetch register 60 is used to reinsert bits of a memory word which were not changed by the storing of a new field.

Barrel section 61 shall provide the shifting network which will have the capacity of shifting 128 bits of information left-end-around 0 to 127 bit locations. During a fetch operation, barrel 61 is used to position the field so that the field is left justified or right justified before being transferred to the requesting device. During a store operation, barrel 61 is used to position the incoming data into the proper bit location of memory. Mask generator 61 provides the facilities for selecting a field from the barrel output circuitry and transferring the field into the output register 63 or into generate register 64. The selected field is determined by the starting bit and length field information provided in the control word and, also, by the type of operation requested. A disclosure of a particular shifting network which may be employed in the present invention is contained in Stokes et al patent application Ser. No. 789,886, filed Jan. 8, 1969 and assigned to assignee of the present invention.

Output register 63 is a 65-bit register and will be used to buffer information during a minimum of one clock period which information is transferred to the requesting device from the various logic circuits in the field isolation unit.

Parity generator 65 is employed to generate parity for all outgoing data words. A parity bit shall follow the data transmission by one clock period.

Input register 66 is a 65 bit register to be used to hold the control word for a parity check. Also, input register 66 will provide temporary buffering during a minimum of one clock period for data transfer from the requesting device.

Parity checker 67 is provided to check all incoming data words. A parity bit shall be received one clock period after the data transmission.

Control word register 68 is a 64 bit register to be used to contain the control word transmitted by the requesting device. While an operation is in progress, this register shall keep track of the exact starting position and the remaining field length of that operation.

Generate register 64 is a 128 bit register and will be used to combine the barrel section output with the fetch register output; the result is a memory word. Also, generate register 64 shall hold the memory word for a minimum of one clock period to enable the code generator to develop check code bits before the word is transferred into the store register.

Store register 69 is a 72 bit register and is used to provide temporary storage for data word which is to be stored at a location specified by proper memory address register 92 of FIG. 6.

Code generator 70 is provided to develop check bits for all information that will be stored in memory. The development of these check bits will establish a means of detecting bit failures between the field isolation unit 13 and memory 12.

Error register 71 is a 64 bit register and will be used to contain all pertinent information necessary to identify and define a failure, such as, external failure (failure caused by the requesting device), internal failure (failure detected within the field isolation unit logic) and memory storage failure (failure due to incorrect stack information).

When words are received from fetch register 60, they contain a total of 72 bits each. The 64 most significant bits are data bits and the remaining 8 bits are check code bits. These check code bits allow the detector and bit correction section 72 to detect one bit error or a two bit error. If a one bit error occurs, the bit will be corrected before the field is transmitted. If a two bit error occurs, no correction is possible. In either case the requesting device will be notified of the failure and what type error occurred.

D. Memory - FIU Interface

Figure 8:
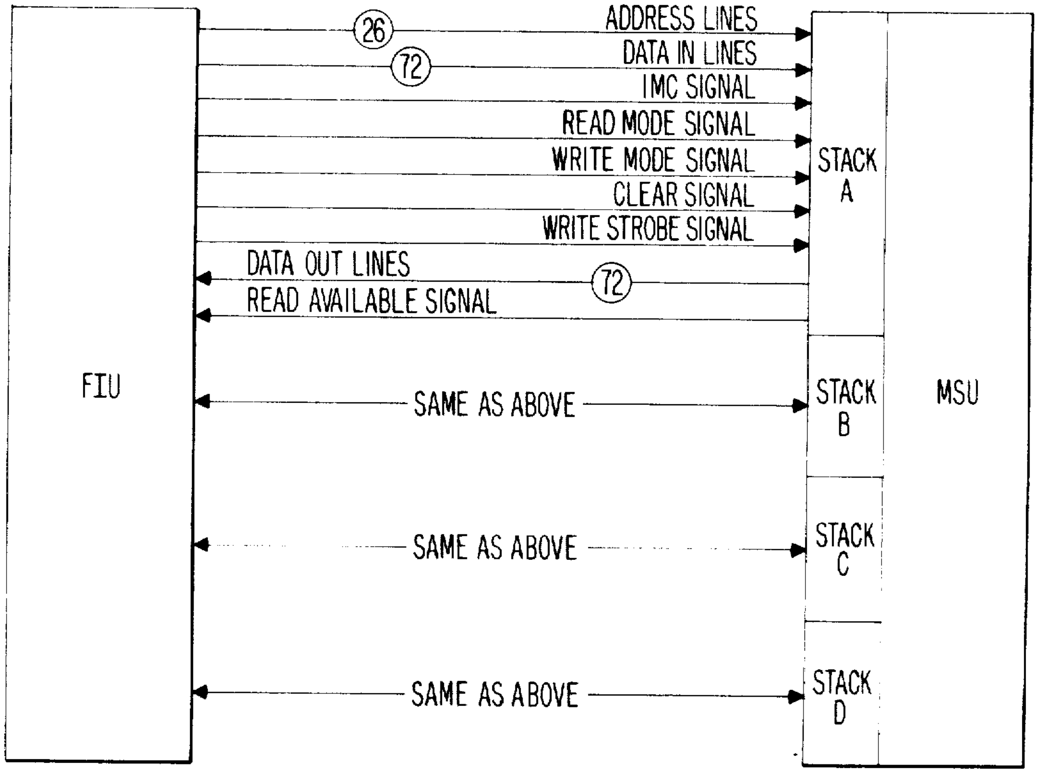
FIG. 8 is a representation of the interface between a memory storage unit and a field isolation unit.

Having thus described both the respective memory storage unit 12 and the field isolation unit 13, the interface between these two units will now be described in reference to FIG. 8. This interface includes both control lines, address lines and data lines. As illustrated in FIG. 8, the interface is repetitious in the sense that the same types of transmission lines are presented to each of the respective four stacks in which each of the memory storage units 12 is organized as was discussed in relation to FIGS. 5 and 6.

As illustrated in FIG. 8, the interface to stack A includes 26 address lines which are used to transfer a 13 bit address that may specify one of the 8,192 memory locations. Interface for addressing contains 26 lines since the memory storage unit 12 requires one and zero digits for each address bit.

There are 72 data in lines which are used to transfer data information that is to be inserted into an address memory location. Correspondingly, there are 72 data out lines which are used to transfer a copy of the contents (72 bits) read from the addressed memory location to the field isolation unit.

The remaining control lines include IMC line which provides the signal to initiate the memory cycle and a read mode signal which is employed to enable the transfer data from an addressed memory location to the memory information register 91 as illustrated in FIG. 6. The write mode signal is employed to enable the transfer of data from FIU 13 to memory information register 91. Clear signal is employed to clear the memory information register prior to data insertion. The write strobe signal is employed to strobe data into the memory information register 91 which makes it available to an addressed location. Read available signal is employed to inform the field isolation unit 13 that data read from the address memory location is present in memory information register 91.

E. Requestor - FIU Interface

Figure 9:
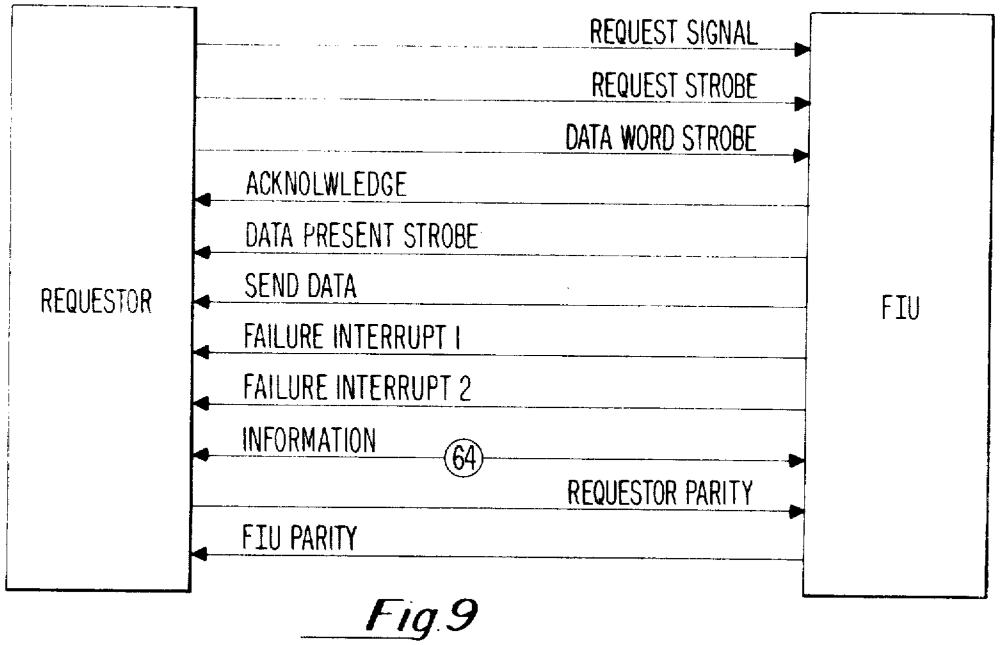
FIG. 9 is a representation of an interface between a field isolation unit and a requesting device.

The interface between field isolation unit 13 and each of the respective requestors is illustrated in FIG. 9 and includes a 64 bit information bus which is bidirectional and employed to transfer both data and control words. The bus is bidirectional in that the information may be transferred either from the field isolation unit to the requestor or from the requestor to the field isolation unit. A minimum of one clock period of dead time is required between consecutive operations whenever the situation is reversed.

The control lines as illustrated in FIG. 9 include a request signal line which supplies a request signal sent by the requestor to select a specific field isolation unit. It must go true one clock period preceding the request strobe and remain true until the first acknowledged signal is received from the field isolation unit. A request strobe signal is sent to inform the field isolation unit that a control word is being transmitted over the information line. Initially, the request strobe goes true one clock period after the request signal goes true and will remain true for one clock period before the control word is sent over the information line. It must remain true until a first acknowledged signal is received for any fetch operation or any store operation the field length of which is greater than 64 bits. The request strobe must be true for one clock period and proceed each transmission of the control word by one clock period for any strobe whose field length is equal to or less than 64 bits.

A data strobe signal is sent to inform the field isolation unit that a data word is to be transmitted over the information line. If the field length of the data word is greater than 64 bits, the data word strobe signal will follow the "send data signal." If the field length of the data word is equal to or less than 64 bits, the data word strobe signal will be sent automatically after the request strobe signal and will be one clock period in duration.

An acknowledge signal of one single clock period pulse is always transmitted to the requestor when service of the requestor is initiated. The requestor, however, must realize that the reception of the first acknowledge does not guarantee the operation will be performed.

A data presence strobe is sent to inform the requestor that a data word is present in input register 66 of the field isolation unit (See FIG. 7). The data presence signal is transmitted in coincidence with the data word for all fetch operations as long as no errors are detected in the read outs from the memory storage unit 12. It should be noted that the data present strobe is not the same as the data word strobe transmitted by the requestor. The data present strobe indicates a valid data word has been transmitted from the field isolation unit.

A send data signal is sent to the requestor whenever the field length of any store operation is greater than 64 bits. Each clock period that the send data signal is true, indicates to the requestor that it must send a data word strobe before it sends a data word. This method of control is necessary to eliminate the need of the requestor to know whether the field isolation unit has a minimum or a maximum memory storage unit configuration.

Failure interrupt one signal informs the requestor that at least one of the following types of errors have been detected by the field isolation unit. The failure interrupt signal is two clocks in duration and is sent to the requesting device that initiated the operation. The types of errors are: two bit error in read out from the memory storage unit, parity error in the control word, illegal operation code in the control word, wrong field isolation unit address in the control word, incorrect number of data word strobes in a store operation, parity error in the requestor data word and internal error.

Failure interrupt two signal informs the requestor that the field isolation unit has detected a one bit error in a read out from the memory storage unit. The failure interrupt two signal is two clocks in duration and is sent to the requesting device that initiated the operation.

The requestor parity line is used to transfer the delayed parity bit for any requestor transmission to the field isolation unit. The delayed parity bit lists always follow the transmitted word by one clock period and must be a minimum of one clock period in width.

F. Processor Memory Interface Unit

Figure 10:
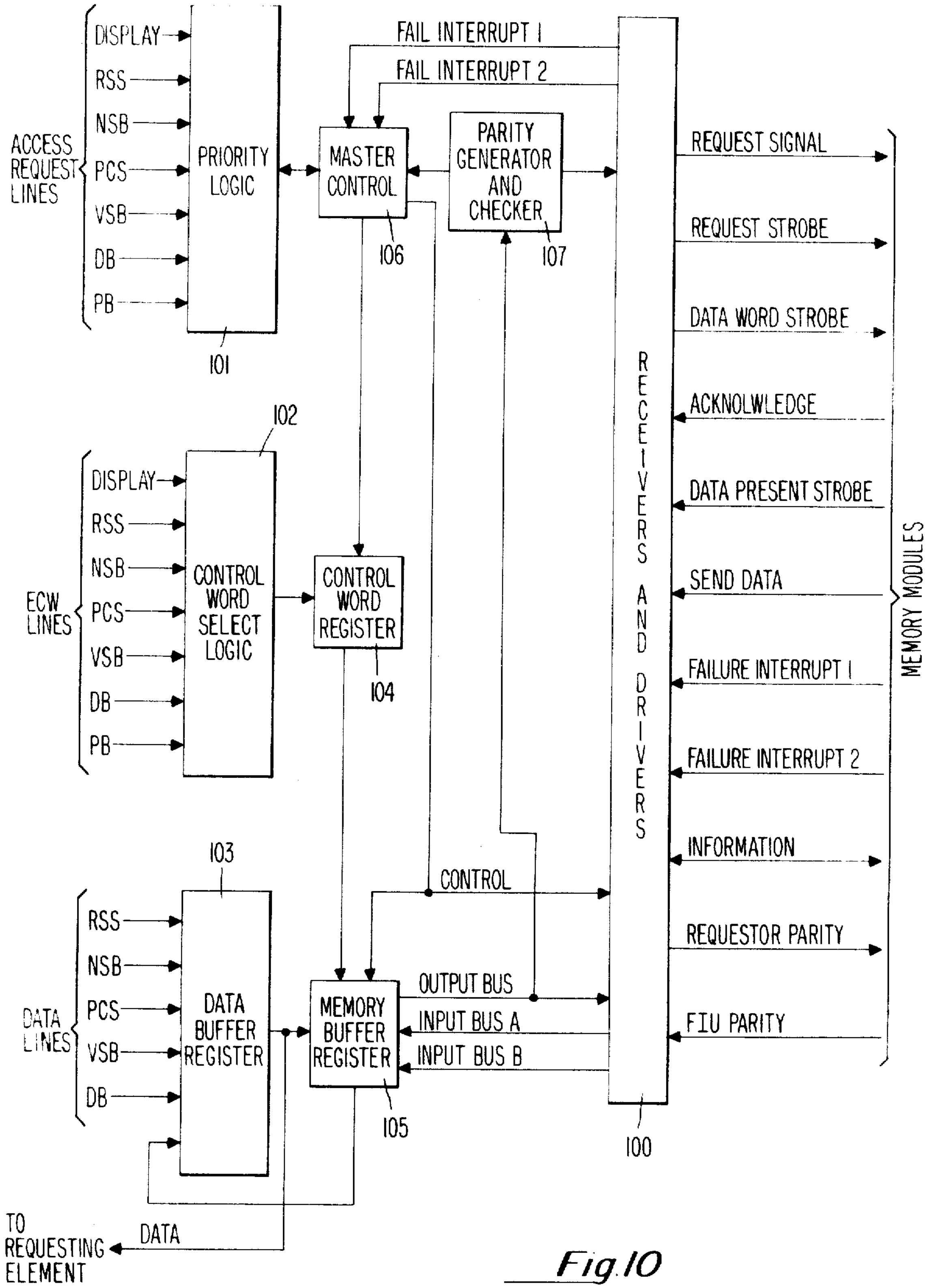
FIG. 10 is a schematic representation of the memory interface unit of a processor of FIG. 2.

The requestor side of the requestor-field isolation unit interface will now be described with relation to FIG. 10. It will be remembered that the field isolation unit can receive and transmit data or control words to any requestor be it a processor, and I/O control unit or the memory extension controller for the level-2 store. However, in FIG. 10, the circuitry illustrated is that which is particularly adapted for a processing unit. Thus the circuitry of FIG. 10 represents the memory interface unit 22 as illustrated in FIGS. 2 and 3.

Memory interface unit 22 (MIU) performs all transfers between the processor and any of up to a maximum of 16 memory modules 11. The MIU handles all data transfers as field-oriented operations and shall manage the memory access requests by the functional elements of the processor on a preassigned priority basis. The access priority assignment shall be specified by the processor and shall be typically involved with the following elements: display, resource stack slice, name stack buffer, program control stack, value stack buffer, description buffer and program buffer.

When one of the functional elements of interpreter 21 requires the services of MIU 22, it shall be required to raise its "access request" line to the MIU and place an element control word (ECW) as illustrated in FIG. 11 on a corresponding ECW line. Each of the respective ECW lines from the respective elements are supplied to control word select logic 102 as illustrated in FIG. 10. When requesting element has priority, the MIU shall load the element control word into its control word register 104 and determine which of the following operations is specified: a single word (field length less than 64 bits) store operation, a multiple word (field length greater than 64 bits) store operation, or a fetch operation.

G. Control Word Format

Referring briefly to FIG. 11, the various fields of the unit control word ECW are defined as follows: type T bit which identifies the service request as a fetch or store operation; justification J bit which identifies the justification required of a single word fetch or store operation where a right justification represents that the least significant bit transferred is placed in the least significant bit position and left justification represents the opposite positioning; lock L bits which identify the type of fetch operation to be performed (i.e. whether or not the field that has been transferred shall be locked). It is the responsibility of the requesting element to know the state of the field it is requesting.

The L1 address field identifies the absolute level-1 storage starting bit position involved in the transfer. The length fields specifies the total length of the field being transferred in bits.

Upon determining the type of operation requested, the MIU shall construct a memory control word MCW of a format illustrated in FIG. 12.

If a single word store operation was specified, the MIU shall raise its request lines to the specified memory module, and then alternately transmit the MCW and the data to be stored to the addressed memory module. MIU 22 shall continue to transmit the MCW followed by the data to be stored until an acknowledged signal is received from the memory module.

If a multiple word store operation is specified the MIU shall raise its request lines to the applicable memory module and then send the MCW to the memory module. When the memory module acknowledges the presence of the MCW, the MIU will commence the data transfer under the control of the data request signal.

If a fetch operation is specified, the MIU shall raise its request lines and send the MCW to the applicable memory module. When the memory module acknowledges the presence of the MCW, the MIU shall enable its information bus receiver circuits. Information from the memory will now be accepted by the MIU. However, the memory shall be required to transmit to the MIU a data present strobe pulse to cause the information present on the information bus to be transferred to and detected by the requesting element. The data present strobe pulse shall be required for each word transferred from memory to the data requesting element.

If either a fetch or store operation requires the involvement of more than one memory module, the MIU shall be required to construct an MCW for each memory module involved. In this case, the MIU shall construct an up dated MCW, and then initiate and conclude the data transfer with the second memory module. If the six least significant bits of the L1 address field in the original MCW were all zeros the up dated MCW shall be required to have a modified L1 address field which points to the first position of the new memory module and a new length field which reflects the number of bits remaining to be transferred. If the six least significant bits of the original L1 address field are not equal to zero the up dated MCW shall be required to have its link L bit set, a modified L1 address field whose six least significant digits are identical to those in the original MCW, bits 18 through 33 shall be all one, and bits 14–17 shall reflect the new memory module numbers, and the modified length field which shall reflect the number of words remaining to be transferred plus one, which is required to reflect the length operation required of the memory.

The various fields of memory control word (MCW) will now be defined with reference to FIG. 12. The T, J, bits as well as the L1 address field and the length field are the same in the MCW as they were in the element control word ECW of FIG. 11. In addition, the modifier bits M1 and M2 are the same as defined for the lock L bits in the ECW.

The specifier S bit identifies a store operation as either a single word store (S=1) or a multiple word store (S=0) operation. This bit also identifies a fetch operation which is requesting that the memory fail register be read and then cleared (S=1).

The length L bit, when present, indicates that the field being transferred is contained in more than one memory module and that its starting memory address was not the beginning of a memory word boundry (zero or a multiple of 64). This bit is required to be in a true state only when fetching or storing a field across a memory boundry and more than one memory module is involved in the transfer. When this situation arises, the length bit must be in the true state when the up-dated MCW is sent to the second memory module.

The mode M bit indicates when present that the memory shall be operated in a defined pattern (e.g., one word every two clocks) as controlled by the memory.

As indicated in FIG. 10, the memory interface unit includes 9 functional components which will now be described.

Priority logic 101 is responsible for granting the services of the MIU to the highest priority requesting element. Control word select logic 102 is responsible for the routing of the element control word ECW of the requesting element to control word register 104 in accordance with priority logic 101. Control word register is a 64 bit register and is used to store the ECW during its execution and up dating by master control section 106. This latter section 106 contains the control logic necessary to execute all MIU operations, including the controls required to complete the receiver and driver paths. Memory buffer register 105 is a 64 bit register and is used to buffer all input and output data to and from the memory via the information interface. Data buffer register 103 is a 64 bit register and is used to buffer all data transfers between the requesting element of the processor and the MIU. This register shall also be used for length transfer operations which necessitate the combining of data fields as has been described above. Parity generator and checker 107 is required to generate parity for all words being transferred to memory and to check the parity of words being fetched from memory. Receivers and drivers 100 include 16 discreet groups of receiver and driver circuits in the MIU, one group per memory module interface. The state of these groups shall be determined by master control 106 and only one group shall be active at any one time.

Processor error register (PER, not shown in FIG. 10) is a 64 bit register and will be used to facilitate recovery from error conditions involving level-1 references by capturing all available control information relating to the reference causing the interrupt. The PER can be programmatically brought to the top of the value stack. Once the PER is loaded with error information, it cannot be loaded again until it is cleared; clearing the PER is done by fetching it. The PER is never loaded unless an actual interrupt is going to occur.

There are two types of errors involved in transfer across the memory interface unit. They are the MIU detected errors and the memory detected errors. One such MIU-detected error is that of no access to memory. This error condition shall be declared if the MIU receives no response from the requested memory module for a period of 25 micro seconds. No response from memory shall be declared if an acknowledged signal is not received from the memory module or when complete data is not transferred by a memory module.

The second MIU detected error is that of disparity. This error condition shall be declared if a fetch of data from memory is received by the MIU with incorrect parity or if data transfer from the interpreter portion of the processor is received by the MIU with incorrect parity or if data transfer from the interpreter portion of the processor is received by the MIU with incorrect parity. If a no access to memory or parity error is detected, the processor error register shall be loaded as was described above.

There shall be two classifications of memory-detected errors which will be reported to the MIU; uncorrectable and correctable errors. These two types of errors shall be reported to the MIU as fail interrupt one signal and fail interrupt two signal respectively; however, the MIU shall send only one fail signal to the interpreter portion of the processor.

Fail interrupt one signal (uncorrectable error condition), if recorded by the memory module while an MIU operation is in progress, the MIU operation shall be terminated and the processor notified of this action. If the error is reported during the time when an MIU operation is not in progress with the reporting memory module, the MIU shall record the failure but it will complete the current operation.

Fail interrupt two signal (correctable error condition) is a type of error signal which shall cause the MIU to notify the processor of the condition, and the operation shall proceed as usual.

With the system thus described, the memory control word presented to the isolation unit shall be stored in control word register 68 as illustrated in FIG. 13. This control word will contain the absolute address of the starting bit of the field to be stored or fetched and the length of the field. From this information, the absolute addresses of a word location containing the starting bit and its next contiguous word location are generated and sent to the memory address registers 92 (see FIG. 12). During a fetch operation, the selected field is shifted by barrel section 61 from its particular bit location as existed in fetch register 60 so that the first bit of the selected field will reside at the first bit position in output register 63. Should the field length overlap more than two contiguous word locations, control register 68 will then generate the addresses of the next pair of contiguous word locations to fetch the remaining bits necessary to complete the field which bits will again be shifted out of fetch register 60 to appropriate bit locations in output register 63 so that the information transfer to the requesting device will be a sequence of 64 bit words with the last word of the sequence having as its first set of bits those bits necessary to complete the field with the remaining bits being zero.

During a store operation, the information in the control register will again specify the absolute address of the starting bit in memory where the field is to be stored plus the length of the field from which the absolute address of the respective pair of contiguous word locations can be calculated. This field will be transferred from the requesting device as a sequence of 64 bit words the number of which will be that necessary to transfer the particular field. Again, the control word register will keep track of the bits that have been transferred and will generate new pairs of memory addresses as required to complete the storage of the field.

In both store and fetch operations, it will be remembered that should the select field overlap a pair of adjacent memory storage units, then the memory interface unit of the requesting device shall generate new memory control words to be sent to the next adjacent memory storage unit. In this manner, fields of any desired length can be stored in the array of memory modules which will appear to the requesting device as being free field or free of structure.

While particular embodiments of the present invention have been described and illustrated, it will be apparent to those skilled in the art that changes and modifications may be made therein without departure from the spirit and scope of the invention as claimed.

What is claimed is:

1. In an information processing system, the combination comprising:
- a random access structured memory unit;
- a processing unit; and
- accessing means coupled between said processing unit and said memory unit to simultaneously address two different structure locations representing contiguous words to access a field of bits within said memory unit in accordance with a control word containing specification of a given bit location in said memory unit as a starting location and also a given number of bits up to the number of bits remaining within said memory unit which specifications define said field.

2. The combination according to claim 1 wherein said accessing means includes control means to receive said control word to determine the address of the memory structure which resides the first bit location of said field.

3. A combination according to claim 2 wherein:
said accessing means transfers to or from said memory unit segments of bits not exceeding in size, the size of said individual memory structure locations, which segment transfers are continued until the specified field has been transfered; and
said control means includes circuitry to up-date the contents of the control word as segments of bits are transferred to or from the memory unit.

4. In an information processing system having a random access structured memory, a processor, and an accessing device coupled between said processor and said memory, and accessing device comprising:
control means to receive a control word containing specification of a starting bit location of a field of bits to be stored in said memory unit and the number of bit locations in said field; and
addressing means responsive to said control means to address two contiguous memory structure locations within said memory unit, the first memory structure location of which is to contain the first portion of said field.

5. An accessing device according to claim 4 which is provided with an information register adapted to receive a number of information bits equal to the number in two of said word locations, which accessing means includes:
insertion and extracting means adapted to insert or extract the set of bits into or from said register, starting at any particular bit location.

6. An accessing device according to claim 5 including:
masking means to prevent entry into those bit positions of said information register that are not to receive said number of bits.

7. An accessing device according to claim 5 including:
a storing register coupled to said insertion and extracting means to receive said set of bits therefrom for subsequent transfer to said information register.

8. An accessing device according to claim 5 including:
a fetching register coupled to said information register to receive said set of bits therefrom for subsequent transfer to said insertion and extracting means.

9. An accessing device according to claim 8 including:
output register means coupled to said insertion and extracting means to receive said set of bits;
said insertion and extracting means being adapted to shift said set of bits so that the first bit of said set resides in said first bit position of said output register.

10. An accessing device according to claim 8 including:
output register means coupled to said insertion and extracting means to receive said set of bits;
said insertion and extracting means being adapted to shift said set of bits such that the last bit of said set is placed in the first bit position of said output register.

11. An information processing system comprising:
a plurality of random access structured memories;
a requesting device adapted to request access to said memories; and
an interface unit coupled to said accessing device to transmit a control word thereto for transfer to or from said memory of different fields of bits;
said interface unit including means to transmit a second control word for a second memory unit should said field of bits reside in portions of both said first and said second memories.

12. In an information processing system having a plurality of random access structured memories and a requesting device adapted to request access to said memories, the combination comprising:
at least one accessing device to access said memories; and
an interface unit coupled to said at least one accessing device to transmit a control word thereto for transfer of different fields of bits to or from one of said memories;
said interface unit including means to transmit a second control word for a second memory unit should a field of bits reside in portions of both said first and said second memory;
said at least one accessing device including:
control means to receive a control word containing specification of a starting bit location of a field in one of said memory units and the number of bit locations in said field; and
addressing means responsive to said control means to address two contiguous memory structure locations within said memory units the first location of which contains the first portion of said field.

13. The combination according to claim 12 wherein said accessing device further includes:
an information register adapted to receive a number of information bits equal to the number of bits in two of said memory structure locations; and
insertion and extracting means adapted to insert or extract the set of bits into or from said register, starting at any particular bit location.

14. The combination according to claim 13 wherein said accessing device further includes:
masking means to prevent entry into those bit positions of said information register that are not to receive said number of bits.

15. The combination according to claim 14 wherein said accessing device further includes:
control means to up-date the contents of the control word as segments of bits are transferred to or from the memory unit.

16. In an information processing system, the combination comprising:
a random access structure memory unit;
an I/O control unit;
a processing unit; and
accessing means coupling said processor and said I/O control unit to said memory unit to simultaneously address two different structure locations representing contiguous words to access a field of bits within said memory unit in accordance with a control word containing specification of a given bit location in said memory unit as a starting location and also a given number of bits up to the number of bits remaining within said memory unit which specifications define said field.

17. In an information processing system having a random access structured memory, a processor, an I/O control unit, and an accessing device coupling said I/O control unit and said processor to said memory, said accessing device comprising:
control means to receive a control word containing specification of a starting bit location of a field of bits to be stored in said memory unit and the number of bit locations in said field; and
addressing means responsive to said control means to address two contiguous memory structure locations within said memory unit, the first memory structure location of which is to contain the first portion of said field.

* * * * *